US009030989B2

(12) United States Patent
Nanjunda Swamy

(10) Patent No.: US 9,030,989 B2
(45) Date of Patent: May 12, 2015

(54) METHOD AND APPARATUS FOR BROADCASTING/MULTICASTING CONTENT FROM MOBILE USER EQUIPMENT OVER AN MBMS NETWORK

(75) Inventor: Satish Jamadagni Nanjunda Swamy, Bangalore (IN)

(73) Assignee: Google Technology Holdings LLC, Mountain View, CA (US)

( * ) Notice: Subject to any disclaimer, the term of this patent is extended or adjusted under 35 U.S.C. 154(b) by 953 days.

(21) Appl. No.: 11/928,483

(22) Filed: Oct. 30, 2007

(65) Prior Publication Data

US 2009/0113487 A1  Apr. 30, 2009

(51) Int. Cl.
  *H04W 4/00*  (2009.01)
  *H04N 7/173*  (2011.01)
  *H04L 12/18*  (2006.01)
  *H04N 21/414*  (2011.01)
  *H04N 21/61*  (2011.01)
  *H04W 72/00*  (2009.01)

(52) U.S. Cl.
  CPC .......... *H04N 7/17318* (2013.01); *H04L 12/185* (2013.01); *H04L 12/189* (2013.01); *H04N 21/41407* (2013.01); *H04N 21/6131* (2013.01); *H04W 72/005* (2013.01)

(58) Field of Classification Search
  CPC ............ H04N 7/17318; H04L 12/185; H04W 72/005
  USPC ......... 370/328, 329, 331, 260, 341, 345, 463; 455/69, 444, 458; 705/64; 709/219, 709/201
  See application file for complete search history.

(56) References Cited

U.S. PATENT DOCUMENTS

| | | | |
|---|---|---|---|
| 2003/0119452 A1* | 6/2003 | Kim et al. ........................ | 455/69 |
| 2004/0180675 A1* | 9/2004 | Choi et al. ..................... | 455/458 |
| 2004/0215698 A1* | 10/2004 | Bertin ............................ | 709/201 |
| 2005/0073974 A1* | 4/2005 | Kim et al. ...................... | 370/329 |
| 2005/0078612 A1* | 4/2005 | Lang .............................. | 370/260 |
| 2005/0085254 A1 | 4/2005 | Chuah et al. | |
| 2005/0243721 A1 | 11/2005 | Cai et al. | |
| 2005/0255886 A1* | 11/2005 | Aaltonen et al. .............. | 455/558 |
| 2006/0068793 A1* | 3/2006 | Van Lieshout et al. ........ | 455/444 |
| 2006/0095384 A1* | 5/2006 | Ishii ................................ | 705/64 |
| 2006/0189272 A1 | 8/2006 | Willenegger et al. | |
| 2007/0041360 A1 | 2/2007 | Gallagher et al. | |
| 2007/0099621 A1 | 5/2007 | Bergqvist et al. | |
| 2007/0105557 A1 | 5/2007 | Israelsson et al. | |

(Continued)

OTHER PUBLICATIONS

Lohmar, et al, "Support of Multicast Services in 3GPP", Ericsson Research, Corporate Unit; Sep. 1, 2004.

*Primary Examiner* — Brian D Nguyen
*Assistant Examiner* — Toan Nguyen
(74) *Attorney, Agent, or Firm* — Faegre Baker Daniels LLP

(57) ABSTRACT

A communication system is provided for implementing a wireless packet broadcast or multicast service. The system includes at least one Radio Access Network (RAN) for communicating with a first UE over a first wireless interface and a General Packet Radio Service (GPRS) Support Node (SGSN) for communicating with the RAN over a second wireless packet interface. A gateway GPRS support node (GGSN) is provided for communicating with the SGSN over a third wireless packet interface and for communicating with external packet-switched networks. A UE Broadcast/Multicast (UEBM) session manager is also provided, which is configured to provision a wireless packet broadcast or multicast service initiated by the first UE.

7 Claims, 4 Drawing Sheets

(56) References Cited

U.S. PATENT DOCUMENTS

| | | |
|---|---|---|
| 2007/0172068 A1 | 7/2007 | Herrmann |
| 2007/0178878 A1 | 8/2007 | Ding |
| 2007/0183358 A1 | 8/2007 | Cai |
| 2007/0183434 A1 | 8/2007 | Pandey |
| 2007/0183458 A1 | 8/2007 | Bouazizi et al. |
| 2007/0191020 A1 | 8/2007 | Fischer et al. |
| 2007/0197235 A1 | 8/2007 | Zhang |
| 2007/0213058 A1 | 9/2007 | Shaheen |
| 2007/0214269 A1 | 9/2007 | Davidsson |
| 2008/0010336 A1* | 1/2008 | Nishizawa et al. ............ 709/201 |
| 2008/0037468 A1* | 2/2008 | Zisimopoulos et al. ...... 370/331 |
| 2008/0098091 A1* | 4/2008 | Benco et al. .................. 709/219 |
| 2009/0015660 A1* | 1/2009 | Vedantham et al. ....... 348/14.09 |

* cited by examiner

Prior Art

METHOD AND APPARATUS FOR BROADCASTING/MULTICASTING CONTENT FROM MOBILE USER EQUIPMENT OVER AN MBMS NETWORK

FIELD OF THE INVENTION

The present invention relates generally to multimedia broadcasting and/or multicasting in a wireless communications context.

BACKGROUND

Since the introduction of packet data services in 3GPP (e.g., GSM and WCDMA), mobile users are virtually always connected and reachable via their mobile devices, which are referred to generally as user equipment (UE). That is, it is becoming more and more common for UEs to be able to receive content at any time. A growing number of content distribution services offered by mobile networks involves group of users interested in receiving similar content (e.g., sports events, news). As long as the group sizes are small and the densities are low, unicast channels can be used to distribute the content. However, the sizes of such groups are generally increasing, making the use of unicast channels problematic. In addition, the content that is distributed is generally requiring increasing amounts of bandwidth as the content shifts from text to multimedia, further exacerbating the problems associated with the use of unicast channels. Thus, instead of using unicast channels to distribute content to groups of mobile users, it is becoming increasingly desirable to distribute content only once to all users simultaneously using broadcasting and multicasting techniques. Multicasting directs content to plural specific subscribers. In contrast, broadcasting provides content that can be accessed by anyone with suitable equipment.

A new service, called multimedia broadcast multicast service (MBMS), is being developed for both broadcasting and multicasting content to mobile users. MBMS introduces support for IP multicast services into the GSM and WCDMA architecture and standardizes the necessary adaptations to cope with the particularities of mobile systems. MBMS is described, e.g., in 3GPP TS 25.246 v6.3.0 (2004-06), 3rd Generation Partnership Project Technical Specification Group Services and Systems Aspects; Multimedia Broadcast/Multicast Service (MBMS); Architecture and functional description (Release 6).

As shown in FIG. 1, the MBMS system can be divided into three functional layers: a bearer service 100, a delivery method 110, and user services 120. The MBMS bearer service 100 provides the mechanisms to transport multicast and broadcast IP data to User Equipments (UE) efficiently. The delivery method 110 can either comprise a download delivery method 112 or a streaming delivery method 114. Delivery methods may use one or many MBMS bearer services, as well as point-to-point bearers, to deliver data. User services 120 enable applications on top of MBMS and may use one to many delivery methods to deliver the application data. MBMS employs two new contexts: a MBMS Bearer context and a MBMS UE context. The latter is kept together with the mobility management contexts in the serving nodes. One MBMS UE context exists for each MBMS group that each terminal has subscribed to. It contains the IP multicast address and Access Point Name (APN) identifying the MBMS bearer that is used. The bearer context also contains a Temporary Mobile Group Identity (TMGI), which is assigned to all the UEs in the same MBMS group, the state of the bearer, QoS attributes, the list of downstream nodes and the UEs hosted by this particular node.

MBMS sessions are set up between a broadcast-multicast service center (BM-SC), a gateway General Packet Radio Service (GPRS) support node (GGSN), and the UE. The MBMS delivery method is triggered by the MBMS user service provider. An MBMS session can comprise multicast or broadcast sessions. In the broadcast mode, the UE performs a local activation of the service independently of the session start at the BM-SC. In the multicast mode, the UE has to first subscribe to the service in order to join a multicast group. Group membership information is maintained in each intermediate node on the transmission path. The information is stored in MBMS specific contexts, which are located in the BM-SC, the GGSN, SGSN and the RNC.

Currently, there is no provision to allow UEs to define a multicast group and transmit content to that group without going through the BM-SC, which can be a relatively difficult and cumbersome process for the average user. UEs, however are increasingly capable of storing and disseminating large quantities of content and users of such devices increasingly desire to share such content with other mobile users.

Accordingly, it would be desirable to provide a method and apparatus that allows a UE to serve as a source of multicast/broadcast content in a MBMS system in a relatively simple and convenient manner.

SUMMARY OF THE INVENTION

In accordance with the present invention, a communication system is provided for implementing a wireless packet broadcast or multicast service. The system includes at least one Radio Access Network (RAN) for communicating with a first UE over a first wireless interface and a General Packet Radio Service (GPRS) Support Node (SGSN) for communicating with the RAN over a second wireless packet interface. A gateway GPRS support node (GGSN) is provided for communicating with the SGSN over a third wireless packet interface and for communicating with external packet-switched networks. A UE Broadcast/Multicast (UEBM) session manager is also provided, which is configured to provision a wireless packet broadcast or multicast service initiated by the first UE.

In accordance with one aspect of the invention, the UEBM session manager may be incorporated in the RAN, the SGSN or the GGSN.

In accordance with another aspect of the invention, the UEBM session manager may be further configured to deliver content from the first UE over a bearer service plane.

In accordance with another aspect of the invention, the UEBM session manager may be further configured to authenticate the first UE as a broadcast/multicast content provider.

In accordance with another aspect of the invention, the UEBM session manager may be further configured to generate a charging record for content transmitted by the first UE.

In accordance with another aspect of the invention, the UEBM session manager may be further configured to locate recipient UEs identified by the first UE.

In accordance with another aspect of the invention, the UEBM session manager may be further configured to allocate network resources for establishing a wireless packet broadcast or multicast session at a session start time defined by the first UE.

In accordance with another aspect of the invention, the wireless packet broadcast or multicast service may be an MBMS service.

DETAILED DESCRIPTION

Figure 2:
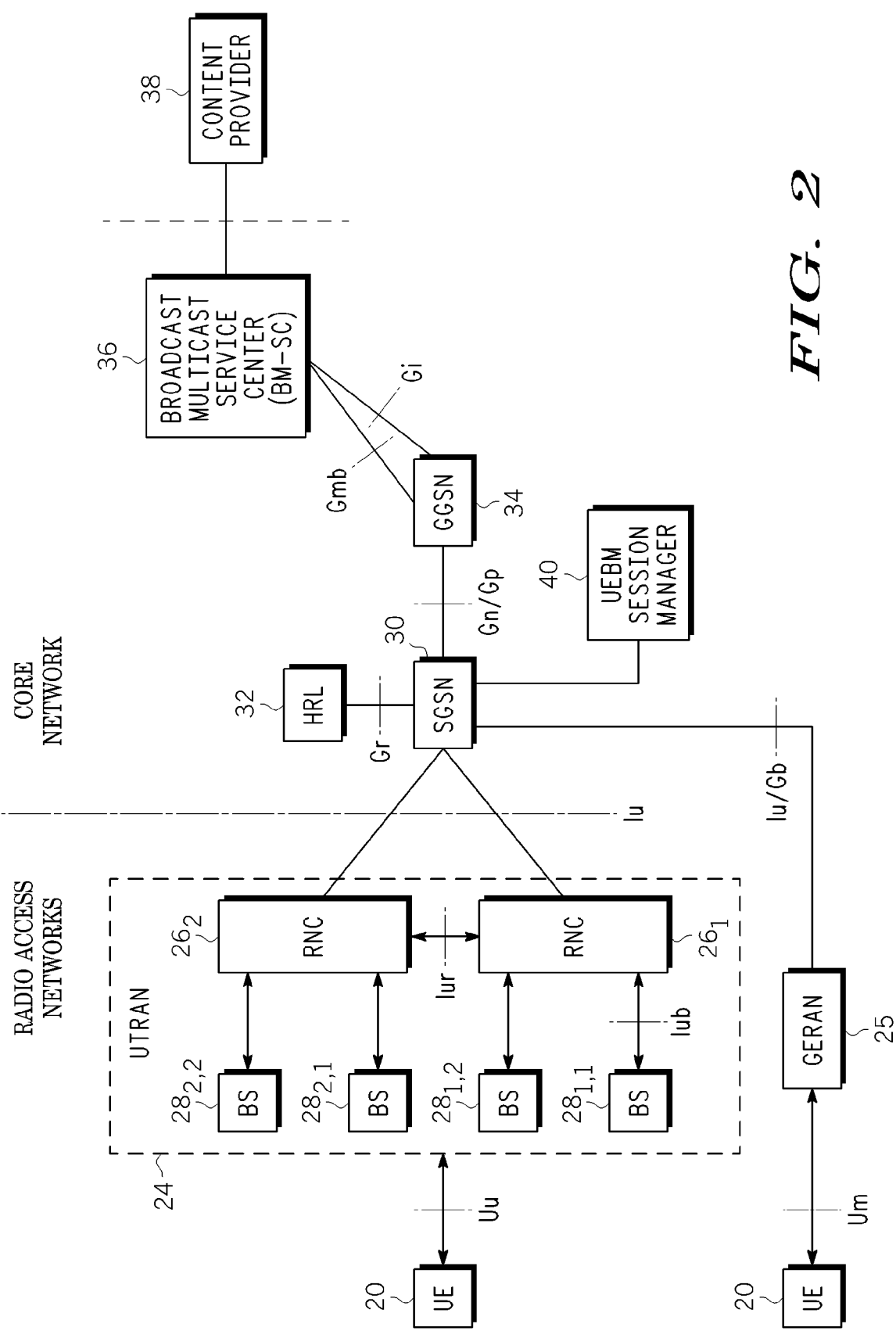
FIG. 2 illustrates one example of a system that supports wireless communications and MBMS services.

FIG. 2 illustrates one example of a system that supports wireless communications and MBMS services. This system may accommodate one or more standard architectures including a universal mobile telecommunications system (UMTS) as well as other systems based on code division multiple access (CDMA), GPRS/EDGE and other access techniques based on time division multiple access (TDMA), etc.

As shown in FIG. 2, one or more radio access networks (RAN) provide radio access services to/from a user equipment unit (UE) 20 over a wireless interface (e.g., Uu or Um). Interfaces are represented in FIG. 2 by dot-dashed lines. The user equipment unit (UE) 20, also termed a mobile terminal, can be any mobile station such as a mobile telephone ("cellular" telephone) and laptops with mobile termination, and thus can be, for example, portable, pocket, hand-held, computer-included, or a car-mounted mobile device which communicates voice and/or data with the radio access network.

The radio access networks can include a UMTS terrestrial radio access network (UTRAN) 24 and a GPRS/EDGE radio access network (GERAN) 25, both of which are used in third generation cellular systems. The RAN may also be a generic access network (GAN) and the RAN node a generic access network controller (GANC). Transport of information over the communications interface between the RBS/Node B and RNC/BSC/GANC interfaces is typically based on asynchronous transfer mode (ATM) or Internet Protocol (IP).

A RAN generally includes one or more radio network controllers (RNCs), base station controllers (BSCs), or generic access network controllers (GANCs). Each controller is coupled to one or more radio base stations (BSs), sometimes referred to as Node Bs. For example, the UTRAN 24 illustrated in FIG. 2 includes one or more radio network controllers (RNCs) 26 and one or more base stations (BS) 28. For sake of simplicity, the UTRAN 24 of FIG. 2 is shown with only two RNC nodes, specifically, RNC $26_1$ and RNC $26_2$. Each RNC 26 is connected to one or more base stations (BS) 28. For example, and again for the sake of simplicity, two base station nodes are shown connected to each RNC 26. In this regard, RNC $26_1$ serves base station $28_{1,1}$ and base station $28_{1,2}$, while RNC $26_2$ serves base station $28_{2,1}$ and base station $28_{2,2}$. Each base station can serve one or more cells. It will be appreciated that a different number of base stations can be served by each RNC, and that RNCs need not serve the same number of base stations.

FIG. 2 shows that a RNC can be connected over an Iur interface to one or more other RNCs in the UTRAN 24. In order to continue to support established connections when an UE moves between cells controlled by different RNCs in the Radio Access Network, a Signaling Network (e.g. Signaling System No 7) enables RNCs to perform the required RNC-RNC signaling.

The UTRAN 24 communicates with core network serving GPRS support nodes (SGSNs) 30 over an Iu interface. The GERAN 25 communicates with core network serving GPRS support nodes (SGSNs) 30 over a Gb (or optionally Iu) interface. The SGSN 30 supports packet-based communications and provides functions such as authentication, ciphering, mobility management, charging data, and logical link management toward the user equipment unit 20. SGSN 30 is coupled to a UE subscriber database called the home location register (HLR) 32 over a Gr interface.

A gateway GPRS support node (GGSN) 34 communicates with one or more SGSNs over a Gn/Gp interface. Gateway GRPS support node (GGSN) 34 provides the interface towards the packet-switched networks (e.g., the Internet, X.25 external networks) and translates data formats, signaling protocols, and address information in order to permit communication between the different networks. The gateway GPRS support node (GGSN) 34 communicates with a broadcast multicast service center (BM-SC) 36 over a Gmb/Gi interface. The multicast/broadcast content is provided by a MBMS content provider 38.

Figure 1:
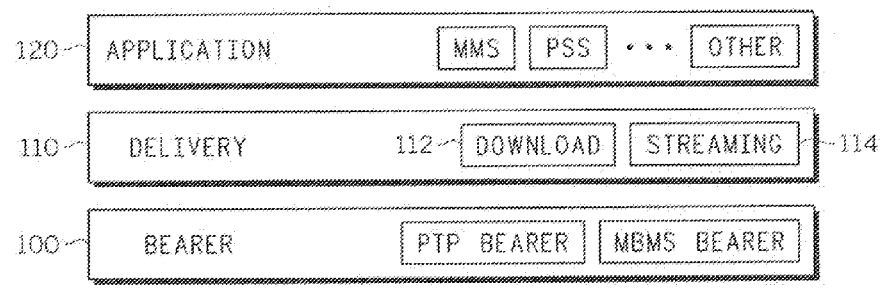
FIG. 1 shows the three function layers of an MBMS system.

The various interfaces mentioned above and shown in FIG. 1 are all defined in the aforementioned 3GPP specification.

The broadcast multicast service center (BM-SC) 36 provides functions for MBMS user service provisioning and delivery such as serving as an entry point for content provider MBMS transmissions and authorizing and initiating MBMS Bearer Services within the PLMN. The BM-SC 36 is a functional entity that exists for each MBMS User Service. The BM-SC 36 generates charging records for content provider transmitted data, and provides the GGSN 34 with transport associated parameters such as quality-of-service and one or more MBMS service areas. Further, the BM-SC 36 may schedule MBMS session transmissions and retransmissions, retrieve content from external sources and provide this content using MBMS bearer services. The BM-SC 36 labels each MBMS session with an MBMS Session Identifier to allow the UE 20 to distinguish the MBMS session retransmissions. Each transmission and subsequent retransmission of a specific MBMS session are identified by a common MBMS Session Identifier (e.g., 2-3 octets) passed at the application layer in the content, which may also be passed in a shortened form (i.e., the least significant octet) in a MBMS Session Start Request message to sent to the RNCs/BSCs/GANCs in the RANs.

The GGSN 34 serves as an entry point for IP multicast traffic as MBMS data. Upon notification from the BM-SC 36, the GGSN 34 requests establishment of a bearer plane for a broadcast or multicast MBMS transmission. Bearer plane establishment for multicast services is carried out towards each SGSN (usually there are multiple such SGSNs) that have requested to receive transmissions for the specific multicast MBMS bearer service. The GGSN 34 receives IP multicast traffic (whether from BM-SC 36 or other data sources) and routes the traffic to the proper GTP tunnels set-up as part of the MBMS bearer service.

The SGSN role within the MBMS architecture is to perform MBMS bearer service control functions for each individual UE and to provide MBMS transmissions to the UTRAN/GERAN. The SGSN 30 supports intra-SGSN and inter-SGSN mobility procedures, which requires the SGSN 30 to store a user-specific MBMS UE context for each activated multicast MBMS bearer service and to pass these user-specific MBMS UE contexts to the new SGSN during inter-SGSN mobility procedures. The SGSN 30 generates charging data per multicast MBMS bearer service for each user. Each SGSN 30 initially tries to establish Iu/Gb and Gn bearers shared by many users on demand when data has to be transferred to the users.

Figure 3:
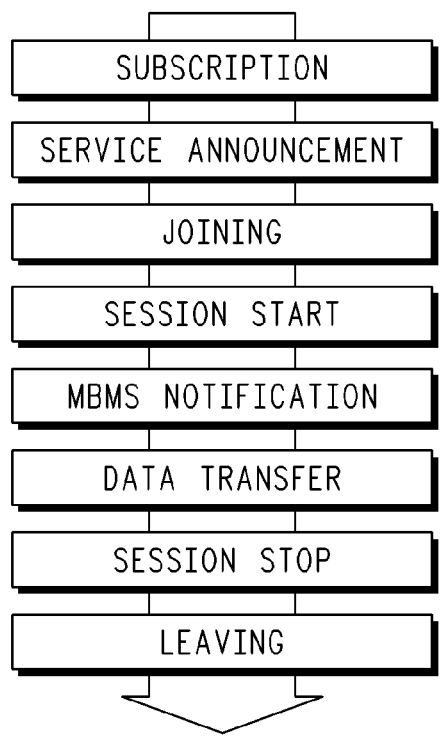
FIG. 3 illustrates the eight phases of an MBMS multicast service.

FIG. 3 illustrates the phases of an MBMS multicast service. There are eight phases: subscription, service announcement, joining, session start, MBMS notification, data transfer, session stop, and leaving. The subscription, joining, and leaving phases are performed individually per user. The other phases are performed for all users interested in the related service.

The subscription phase establishes the relationship between the user and the service provider, which allows the user to receive the related MBMS multicast service. A subscription is an agreement of a user to receive service(s) offered by an operator. Subscription information is recorded in the BM-SC. MBMS user service announcement/discovery mechanisms allow users to request or be informed about the range of MBMS user services available.

A service announcement distributes to users information about the service, parameters required for service activation (e.g. IP multicast address), and possibly other service-related parameters (e.g. service start time).

Joining (i.e., MBMS multicast activation by the user) is the process by which a subscriber joins (i.e., becomes a member of) a multicast group. That is, the user indicates to the network that he/she is willing to receive multicast mode data of a specific MBMS bearer service.

Session start is the point at which the BM-SC is ready to send data and occurs independently of activation of the service by the user. Session start also triggers bearer resource establishment for MBMS data transfer.

MBMS notification informs the UEs about forthcoming (and potentially about ongoing) MBMS multicast data transfer, and data transfer is the phase when MBMS data are transferred to the UEs.

Session stop is the point at which the BM-SC determines that there will be no more data to send for some period of time. This period is generally long enough to justify removal of bearer resources associated with the session. At the leaving phase, a subscriber leaves (i.e., stops being a member of) a multicast group.

Figure 4:
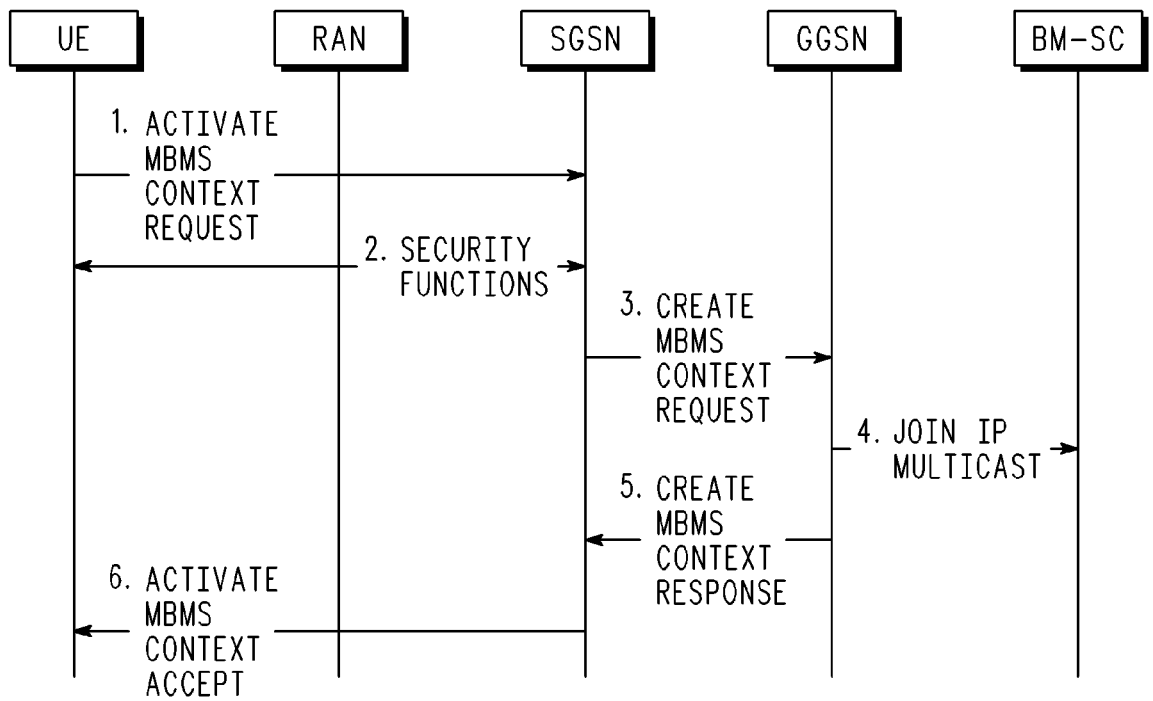
FIG. 4 is a signaling diagram illustrates one example of the joining process of FIG. 3 in more detail.

The joining procedure mentioned above, which may also be referred to as "MBMS Service Activation" is carried out between the UE, the SGSN and the BM-SC in the manner depicted in FIG. 4. A more detailed description of this joining procedure is described, for example, in 3 GPP TS 23.846-6.1.0, "Multimedia Broadcast/Multicast Service; Architecture and Functional Description, (Release 6)", which is hereby incorporated by reference.

In the joining procedure, a so-called MBMS context (e.g., a packet data protocol content) is generated in the RNCs 26, linking the identity of each joined UE with the identity of the MBMS service which provides the MBMS content. As a result, the RNCs may distribute the MBMS content into the radio cells. In this way all joined UEs located in the respective radio cells may receive the MBMS content. This process is depicted in more detail in the signaling diagram of FIG. 4.

As indicated at 1 in FIG. 4, the UE sends an active MBMS Context Request Message to the SGSN. The activate MBMS Context Request Message includes an IP Multicast address, which identifies the MBMS Multicast Service to which the UE wants to subscribe, i.e. which the UE wants to join. An APN (access point name) specifies the GGSN. Then, the SGSN analyses the activate MBMS Context Request message and determines the RNCs, which support the routing area in which the UEs are located and generates a number of MBMS contexts. The number of MBMS contexts corresponds to the number of RNCs serving the routing area. Then, as indicated at 2 in FIG. 4, security functions may be carried out, such as an authentication of the UE. Then, as indicated at 3 in FIG. 4, the SGSN determines the RNCs which support or serve the routing area and requests generation of an MBMS context on the GGSN. The SGSN also establishes a GPRS tunnel between the SGSN and GGSN.

As indicated at 4 in FIG. 4, the GGSN establishes a connection for the requested multicast IP address to the MBMS data source, i.e. the BM-SC in case the GPRS tunnel is the first one for this MBMS multicast service. Then, as indicated at 5 in FIG. 4, the GGSN confirms the generation of the MBMS contexts to the SGSN. Finally, as indicated at 6 the SGSN sends an activate MBMS Context Accept Message to the UE, which includes the TMGI, i.e. the temporary multicast group identity.

During the joining process described above, the ULEs may receive security related data (e.g., encryption keys), which enables them to decode the MBMS content. A "joined" UE can relinquish its reception privilege in a corresponding "leaving" procedure. When a UE leaves, the security related data is amended so that only the remaining "joined" UEs are able to decode the MBMS content.

As shown in FIG. 2 a functional entity referred to herein as a UE Broadcast/Multicast (UEBM) session manager 40 is provided to support MBMS services originating from a UE. In some cases, as in FIG. 2, the UEBM session manager 40 may be located in the MBMS network. While in FIG. 2 the session manager 40 is shown in communication with the SGSN 30, more generally the UEBM session manager 40 may be situated at any convenient location in the MBMS network, including, for example, the SGSN 30 itself or the GGSN 34. The functionality of the session manager 40 may also be distributed among multiple entities or nodes in the MBMS network. In other cases, instead of locating the UEBM session manager 40 in the MBMS network, it may be located in the radio access network such as in the UTRAN 24 or GERAN 25.

The UEBM session manager 40 provides functions for MBMS user service provisioning and delivery such as serving as an entry point for UE MBMS transmissions and authorizing and initiating MBMS Bearer Services. The UEBM session manager 40 generates charging records for UE content provider transmitted data, and provides transport associated parameters such as quality-of-service and one or more MBMS service areas. Further, the UEBM session manager 40 may schedule MBMS session transmissions and retransmissions, retrieve content from external sources and provide this content using MBMS bearer services. The UEBM session manager 40 labels each UE MBMS session with a UE MBMS Session Identifier to allow the recipients to distinguish the MBMS session retransmissions.

Figure 5:
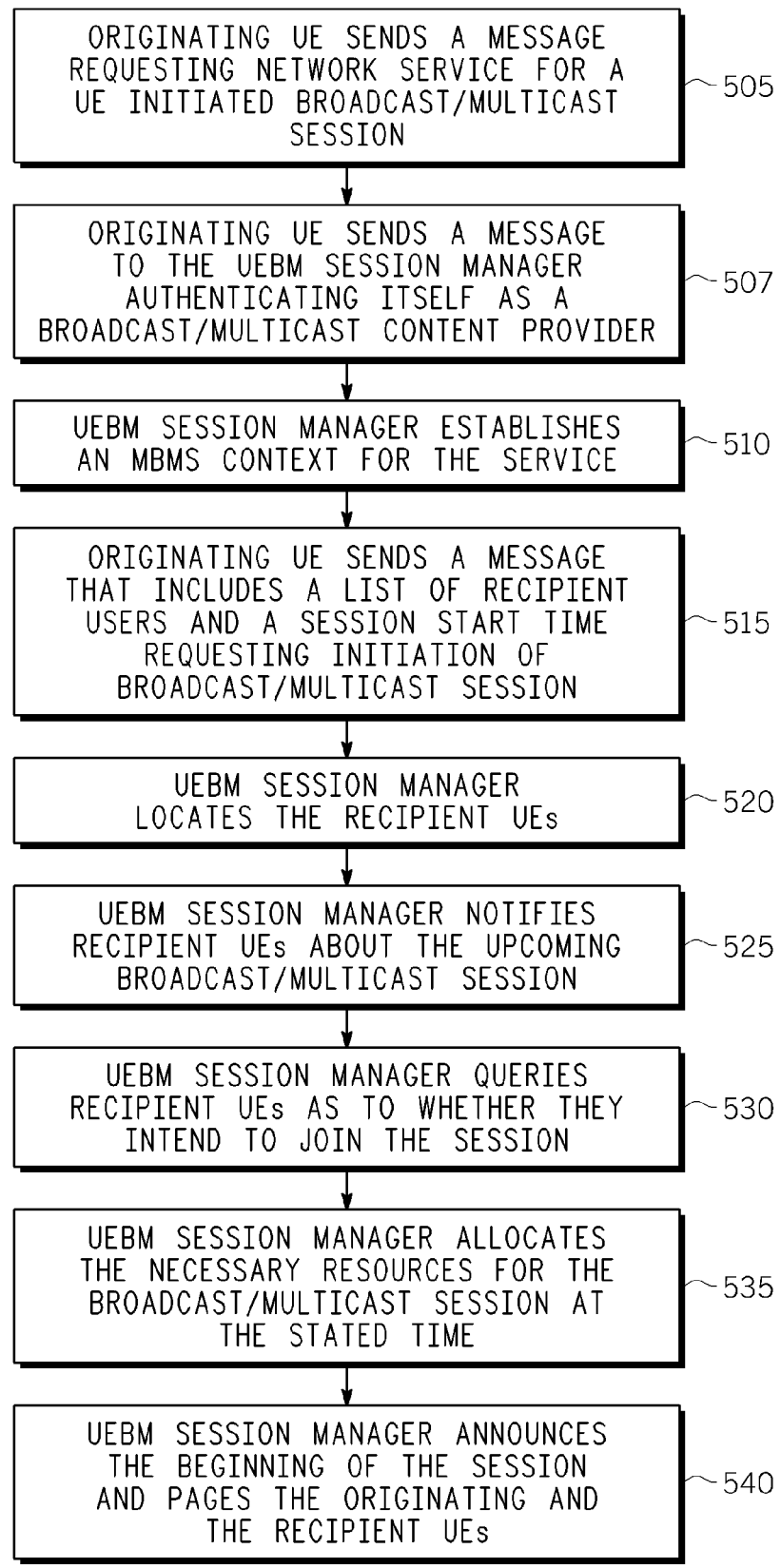
FIG. 5 shows one example of a process that may be used by a UE to establish an MBMS service.

One example of a process that may be used by a UE to establish an MBMS service using the UEBM session manager 40 is shown in FIG. 5. This process encompasses the service announcement, joining, session start, MBMS notification, and data transfer phases depicted in FIG. 3. The process begins in step 505 when an originating UE that wants to broadcast or multicast content to recipient UEs sends a message (e.g., a Non Access Stratus level message or a RAN level message) requesting network service for a UE initiated broadcast/multicast session. In addition, in step 507 the UE sends a message to the UEBM session manager 40 authenticating itself as a broadcast/multicast content provider. Of course, the content of the messages referred to in steps 505 and 507 may also be sent in a single message or, alternatively, distributed over three or more separate messages. In step 510 the UEBM session manager 40 responds to the originating UE with an acknowledgement message and establishes an MBMS context for the service. The originating UE, in step 515, sends a message (e.g., a Call Control/NAS message such as a service request message) to the UEBM session manager 40 requesting initiation of broadcast/multicast session. The message includes a list of recipient users and a session start time. The recipient UEs can be identified in the list by a user identifier such as a phone number. In response, the UEBM session manager 40 locates the recipient UEs, either by itself or through other nodes in the MBMS network in step 520. The recipient UE can be located by using well known techniques such as Location Based Services (if the originating and recipient UEs are associated with the same service provider), the MBMS notification procedure, or by initiating a new call if they are associated with different service providers. Once they are located the recipient UEs are notified about the upcoming broadcast/multicast session in step 525 and the originating UE is notified that the recipient UEs have been located. The notifications in step 525 can be accomplished using, for example, an application level notification procedure such as SMS or a RAN level notification procedure. Optionally, in step 530, the recipient UEs may be queried by the UEBM session manager 40 as to whether they intend to join the session and this information can be reported back to the originating UE. In step 535, at the designated start time the UEBM session manager 40 allocates the necessary resources for the broadcast/multicast session by using, for instance, the MBMS-defined resource establishment and paging procedures such as depicted in FIG. 4 in which an MBMS context is established linking the identity of each recipient UE with the MBMS service and the originating UE. In step 540 the session manager 40 announces the beginning of the session and pages the originating and the recipient UEs. At this point the originating UE can begin to transmit the content to the recipient UEs in step 545.

In some cases the UEBM session manager 40 can restrict the availability of the MBMS service in any of a variety of ways. For instance, the service can be limited to specified geographic areas, preregistered UEs or predefined UEs (e.g., a buddy list), UEs that belong to a common service provider and the like. Such restrictions can be implemented so that the MBMS service can be offered to enterprises, educational institutions, youth groups and the like, where the geographic location is small. The UEBM session manager 40 can also optionally implement content screening to ensure that the UEs comply with any MBMS service policies.

The processes described above, including but not limited to those presented in connection with FIG. 5, may be implemented in general, multi-purpose or single purpose processors. Such a processor will execute instructions, either at the assembly, compiled or machine-level, to perform that process. Those instructions can be written by one of ordinary skill in the art following the description of presented above and stored or transmitted on a computer readable medium. The instructions may also be created using source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized wireline or wireless transmission signals.

A method and apparatus has been described which allows a ULE to serve as a source of multicast/broadcast content in a MBMS system in a relatively simple and convenient manner by providing in the MBMS system a UEBM session manager that is dedicated to this purpose.

The invention claimed is:

1. A communication system for implementing a wireless packet broadcast or multicast service, comprising:
    at least one Radio Access Network (RAN) for communicating with a first UE over a first wireless interface;
    a UE Broadcast/Multicast (UEBM) session manager configured to provision a wireless packet broadcast or multicast service initiated by the first UE, to deliver content from the first UE to a list of recipient UEs, to query the recipient UEs as to whether they will be joining the wireless packet broadcast or multicast service initiated by the first UE, and to report to the first UE as to whether the recipient UEs will be joining the wireless packet broadcast or multicast service, wherein at least one of a start time of the wireless packet broadcast or multicast service and a list of recipient UE's is identified to the UEBM by the first UE, wherein the UEBM informs the first UE at the start time that transmission may begin, and wherein the content is received by the UEBM from the first UE after the start time and streamed to the list of recipient UE's by the UEBM over an MBMS bearer service plane after the start time; and
    a radio service support node for: communicating with the RAN over a second wireless packet interface; and a gateway support node for communicating with the radio service support node over a third wireless packet interface and for communicating with external packet-switched networks, and wherein the UEBM session manager is incorporated in the RAN, the radio service support node or the gateway support node.

2. The communication system of claim 1 wherein the UEBM session manager is further configured to deliver content from the first UE over a bearer service plane.

3. The communication system of claim 1 wherein the UEBM session manager is further configured to authenticate the first UE as a broadcast/multicast content provider.

4. The communication system of claim 1 wherein the UEBM session manager is further configured to generate a charging record for content transmitted by the first UE.

5. The communication system of claim 1 wherein the UEBM session manager is further configured to locate recipient UEs identified by the first UE.

6. The communication system of claim 1 wherein the UEBM session manager is further configured to allocate network resources for establishing a wireless packet broadcast or multicast session at a session start time defined by the first UE.

7. The communication system of claim 1 wherein the wireless packet broadcast or multicast service is an MBMS service.

* * * * *